United States Patent [19]

Svendsen

[11] 4,268,785
[45] May 19, 1981

[54] TRANSIENT OVERSHOOT, UNDERSHOOT AND DELAY COMPENSATION CIRCUIT IN SYSTEMS COMPRISING REACTIVE FILTER NETWORKS

[75] Inventor: Gordon D. Svendsen, Belmont, Calif.

[73] Assignee: Ampex Corporation, Redwood City, Calif.

[21] Appl. No.: 75,562

[22] Filed: Sep. 13, 1979

[51] Int. Cl.³ .............................................. G05B 5/01
[52] U.S. Cl. .................................. 318/620; 318/608; 360/78; 328/14
[58] Field of Search ............... 318/611, 617, 619, 620, 318/608, 561; 360/77, 78; 328/14; 323/17

[56] References Cited

U.S. PATENT DOCUMENTS

| | | | |
|---|---|---|---|
| 3,273,035 | 9/1966 | Inderhees | 318/619 X |
| 3,646,480 | 2/1972 | Spaulding | 328/14 |
| 3,924,268 | 12/1975 | McItosh | 318/617 X |
| 4,135,217 | 1/1979 | Jacques et al. | 360/77 |

Primary Examiner—B. Dobeck
Attorney, Agent, or Firm—Robert G. Clay; Elizabeth E. Strnad

[57] ABSTRACT

A compensation circuit for overshoot, undershoot and delay occurring in response to sudden D. C. level changes in signals received by reactive filters. A D. C. level change, represented by an input signal step applied to the reactive filter is detected by the compensation circuit. The compensation circuit responsively provides a compensation D. C. signal step of a predetermined magnitude and polarity with respect to the input signal step. The compensation step is applied by the circuit to the signal return line of the reactive filter, simultaneously with the input signal step received by the filter to maintain a substantially constant D. C. signal level with respect to the reactive filter elements. The reactive filter elements are thus prevented from charging and discharging in response to the input signal step and filter delay is eliminated.

22 Claims, 4 Drawing Figures

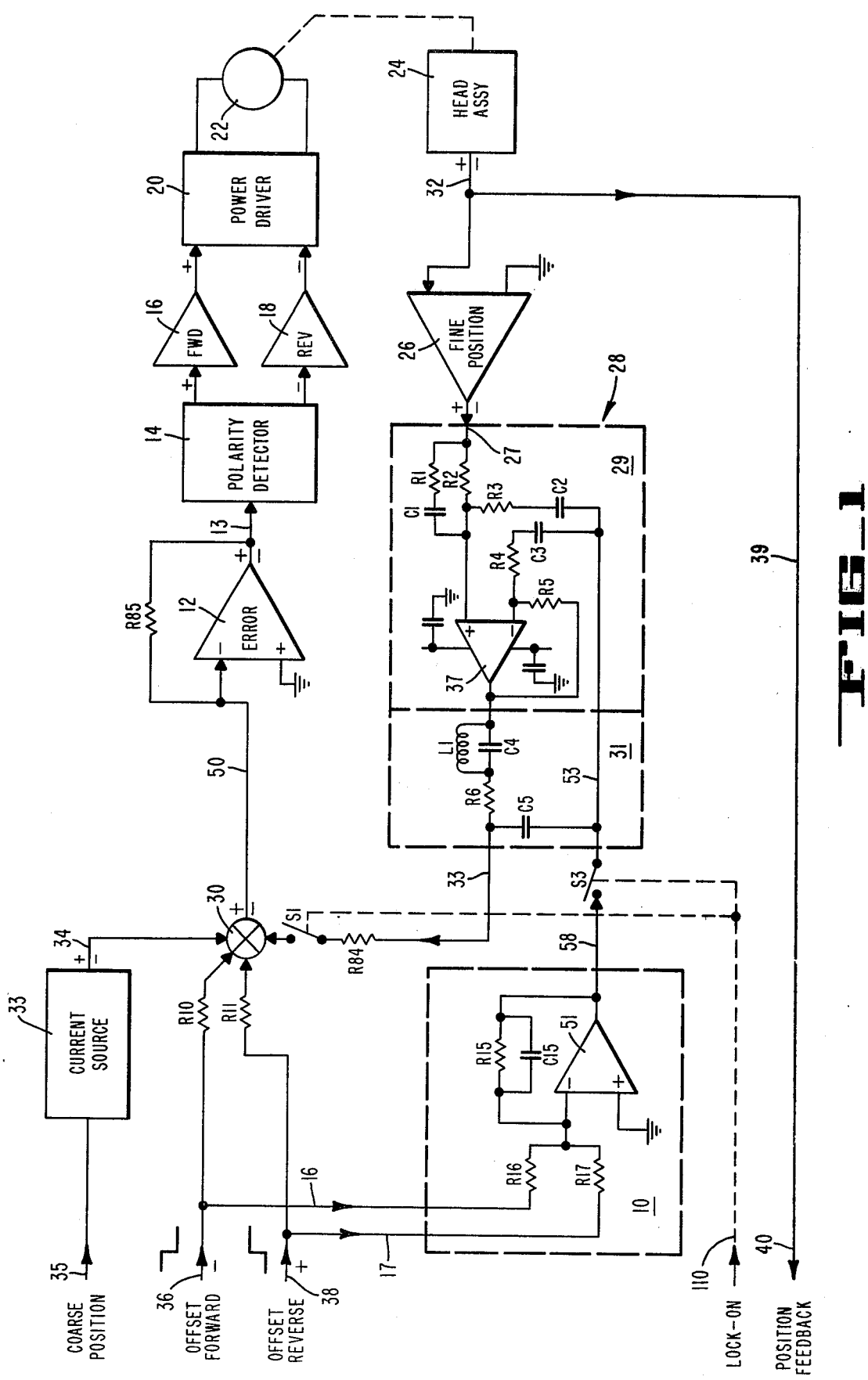
FIG_1

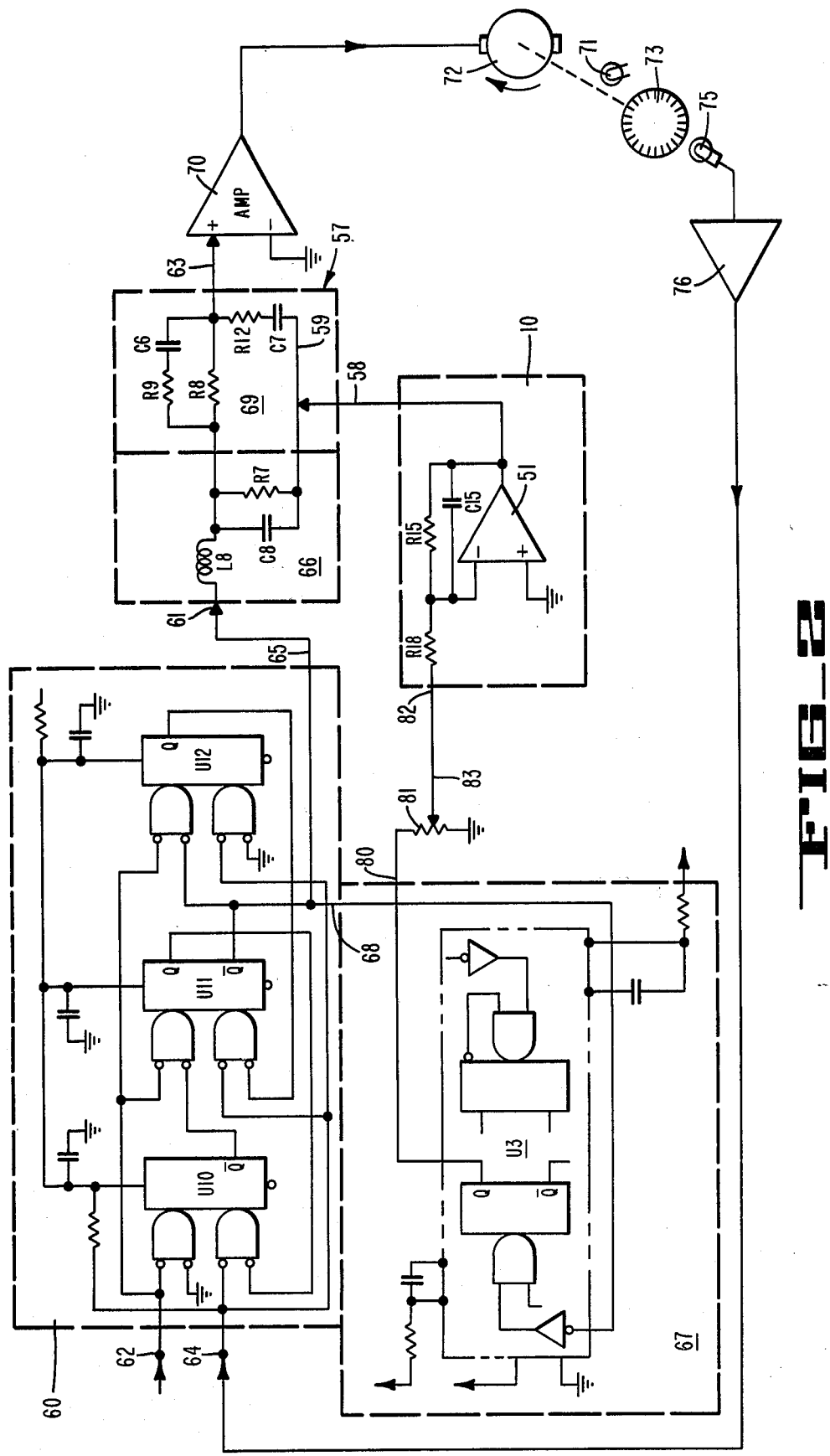
FIG_2

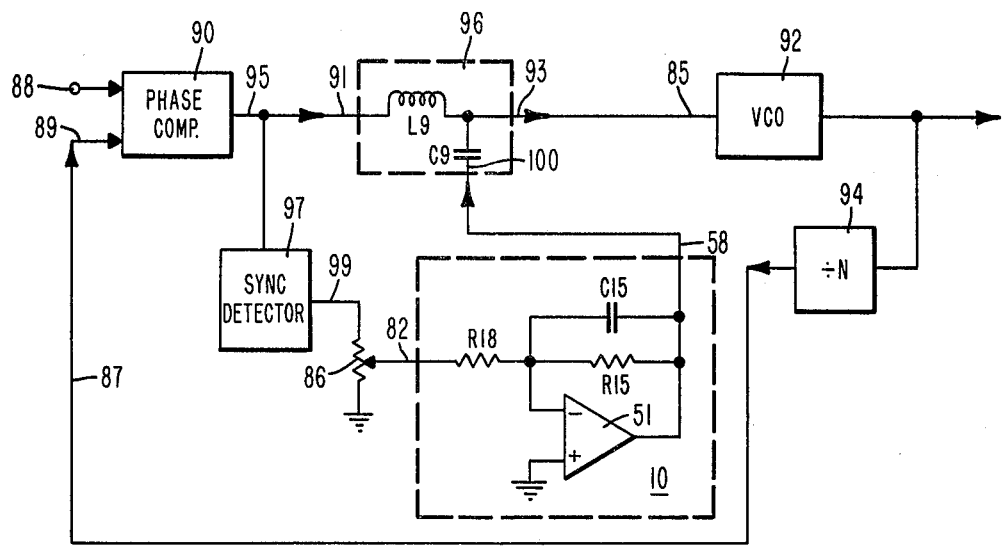
FIG_3
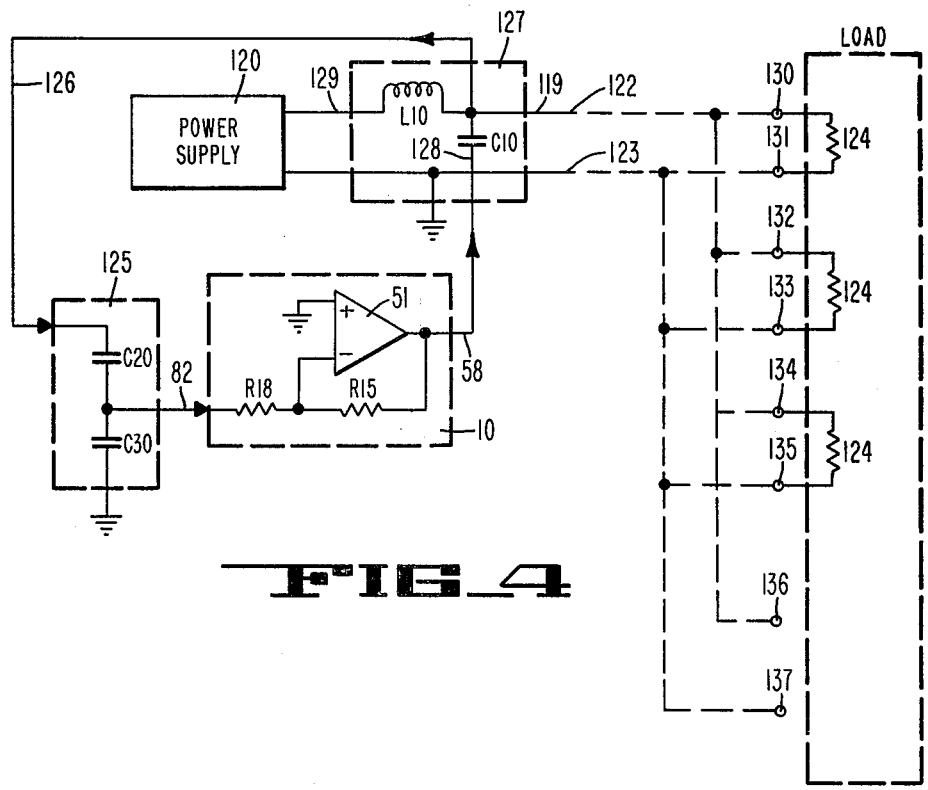
FIG_4

TRANSIENT OVERSHOOT, UNDERSHOOT AND DELAY COMPENSATION CIRCUIT IN SYSTEMS COMPRISING REACTIVE FILTER NETWORKS

BACKGROUND OF THE INVENTION

The invention relates to a circuit for automatic compensation of transient overshoot, undershoot and delay in systems utilizing filter networks with reactive components.

Filter networks having reactive components are known to provide overshoot or undershoot transients in response to sudden D.C. signal level changes applied thereto. These transients, in turn, add to the delay in the filter response. Even in critically damped filters, which do not exhibit such overshoot or undershoot transients, a delay in response to sudden D.C. level changes occurs due to recovery time necessary for adjusting the reactive elements of the filter to a new D.C. signal level.

The above-indicated inherent features of reactive filter networks are particularly undesirable in applications where fast response, that is, minimum delay in filter operation, is required.

For example, in automatic control circuits utilizing servo loops with filters having reactive components, input signal variations must be followed by the loop accurately and with minimum delay. When a sudden input signal level change in the form of a D.C. voltage step is applied to such circuit, for example, to produce a position offset in a positioning servo loop, the reactive compounds charge or discharge to the new D.C. level, thus causing damped oscillations and added filter delay due to overshoot or undershoot transients.

Prior art servo circuits compensate for the above effects by reducing the gain of the servo loop to minimize oscillations. The result is a servo operating below the optimum loop gain and, thus, with reduced accuracy.

In some applications, for example, in high density magnetic recording and playback, reducing the gain of the servo loop is impractical, since it decreases positioning accuracy. To the contrary, in the latter applications, where both the recording track width and inter-track spacing is reduced, the accuracy of the head positioning servo must be further improved, and the servo response time minimized. To this effect, it is desirable to further increase the servo gain while obtaining stable operation in close proximity of mechanical resonant frequencies, for example, by utilizing reactive filter networks. However, reactive filters are known to increase the servo loop response time due to overshoot or undershoot transients provided in response to D.C. step signals injected in the loop.

An example of a prior art device comprising a positioning servo circuit is described in the Operation and Maintenance Manual, DM 940/DM 980 Disk Storage Drive, No. 3306658-01, issued October 1977, by Ampex Corporation, assignee of this patent application. More particularly, FIGS. 3-4 on page 3-9 of that Manual shows a basic servo block diagram, including a fine mode positioning servo control circuit. The latter circuit is utilized for maintaining the transducer assembly of the disk storage within a designated track location until a subsequent coarse positioning mode is initiated, as it is known in the art. As it is shown, for example, in the detailed circuit diagram No. A 04, sheet 1 of 3, and indicated on page 3-57, paragraphs 6 and 7, of the Manual, when the servo head is within a designated track location, an offset forward or reverse signal may be applied by the control electronics to the servo. The latter respective signals are negative or positive D.C. voltage steps injected in the servo loop, which serve to move the servo head and, thus, the entire head assembly slightly in either direction with respect to the center of the servo track in order to maximize the signal obtained from the recorded data tracks with respect to the playback heads.

In the above-indicated prior art magnetic disk recorders the gain of the servo amplifier has been selected relatively low to minimize servo oscillations, overshoot or undershoot in response to the D.C. offset forward or reverse signal.

However, when it becomes necessary to substantially increase, for example to double, the recording track density with respect to these prior art magnetic disk recorders, the above-indicated servo gain cannot further satisfy the consequent requirement for an improved positioning accuracy, as well as shorter response time and, thus, extended servo performance.

One embodiment of the present invention overcomes the above-described disadvantages of prior art positioning servo circuits by providing a reactive filter circuit which allows for increasing the servo loop gain and bandwidth, in combination with a circuit for compensation of overshoot and undershoot transients and delay in response to D.C. signal level changes applied to the reactive filter circuit, as it will be disclosed in the specification in more detail.

Examples of further prior art devices in which undesirable transient overshoot, undershoot and delay in reactive filter circuits occurring in response to sudden D.C. signal level changes may exceed the limits set for reliable operation, include, for example, magnetic tape drive capstan servo circuits, frequency synthesizers, regulated power supply circuits, and many other applications. As it will become apparent from the following specification, various alternative embodiments in accordance with the present invention eliminate the above-indicated disadvantages of the respective prior art devices.

It is noted that throughout the specification and claims under "reactive filter", "reactive filter network", "reactive filter circuit", and like terms, a passive or active filter is understood comprising one or more reactive elements which may be combined with resistive or other filter elements and having at least one filter element coupled between an input, an output and a signal return line of the filter.

SUMMARY OF THE INVENTION

Accordingly, it is an object of the invention to provide a circuit for automatic compensation of overshoot and undershoot transients and delay in systems utilizing reactive filter networks.

It is another object of the invention to provide a circuit eliminating delays in reactive filters occurring in response to D.C. signal steps due to overshoot or undershoot transients and filter recovery time.

It is still another object of the invention to provide compensation of overshoot and undershoot transients in reactive filters without providing critical damping of these filters.

It is a particular object of the invention to provide a circuit for compensation of overshoot and undershoot transients in servo loops comprising reactive filters, without reducing the bandwidth or gain of the servo loop.

It is a further object of the invention to provide compensation of overshoot and undershoot transients in servo circuits while maintaining a stable operation of these circuits in close proximity to mechanical resonant frequencies.

It is a further object of the invention to compensate for a D.C. signal level change with respect to reactive filter elements in response to an input signal step.

In accordance with the present invention, a circuit is provided for automatic compensation of overshoot and undershoot transients and delay in response to D.C. signal steps applied to circuits utilizing reactive filters. The compensation circuit detects an input step signal applied to the reactive filter, and it provides a compensation step signal and applies it to the return line of the filter, simultaneously with the input step signal received by the filter. The compensation signal is substantially of the same magnitude and of a predetermined polarity with respect to the input step signal to compensate for a resulting signal level change with respect to the reactive filter.

The foregoing and further objects, features and advantages of the invention will become apparent from the following description and accompanying drawings.

BRIEF DESCRIPTION OF THE DRAWINGS

FIG. 1 is a block diagram showing a preferred embodiment of the invention utilized in a magnetic disk drive fine positioning servo circuit.

FIG. 2 is a block diagram showing an alternative embodiment of the invention utilized in a magnetic tape drive capstan servo circuit.

FIG. 3 is a block diagram showing another alternative embodiment of the invention utilized in a frequency synthesizer circuit.

FIG. 4 is a block diagram showing a still further embodiment of the invention utilized in a regulated switching power supply circuit.

DESCRIPTION OF THE PREFERRED AND ALTERNATIVE EMBODIMENTS the preferred embodiment of the invention shown in FIG. 1 is utilized in a position and velocity servo of a disk storage drive system, manufactured by Ampex Corporation, assignee of this patent application. The block diagram of FIG. 1 comprises known basic servo circuit components, such as shown and described in the previously indicated Manual, in combination with the reactive filter circuit 28 and compensation circuit 10 in accordance with the teachings of the present invention. Consequently, only those portions of the basic servo system will be shown and described in the following specification, which are necessary to understand the operation and advantages of the invention.

The circuit of FIG. 1 comprises an error amplifier 12 utilized during both the coarse and fine positioning modes of the servo circuit. During the coarse positioning mode, the error amplifier 12 receives via line 50 at its inverting (−) input a forward or reverse current, which is applied from a current source 33 via line 34 and a summing junction 30. The input of the current source 33 is coupled to terminal 35, where it receives a digital signal from a difference counter (not shown), indicating the number of cylinder tracks to be crossed in either direction to obtain the desired position of the head assembly 24 with respect to the disk surface. The polarity and number of bits representing the digital signal is determined by a difference calculator (not shown), and is dependent on the actual cylinder track location of the servo head and a desired cylinder track location, to which the head has to move. The forward or reverse current causes the output signal of the error amplifier 12 to increase or decrease. A polarity detector 14 whose input is coupled via line 13 to the output of error amplifier 12, drives a forward amplifier 16 and a reverse amplifier 18, respectively, depending on the output signal polarity of the error amplifier 12. The respective output signal from the forward or reverse amplifier 16 or 18 is applied to a power driver 20, which in turn causes current to flow through a voice coil of linear motor 22 in either direction. The motor 22 moves the head carriage (not shown) to which the head assembly 24 including the data heads and servo head is attached. The servo head supplies via line 39 and terminal 40 position feedback information indicating cylinder track crossings to the difference counter (not shown), which information updates, that is decrements, the difference counter. Consequently, the digital signal applied to the input terminal 35 is also decremented, until the difference count is zero and no current is applied from the current source 33 to the error amplifier 12; thus, indicating that the servo head has completed its move in the coarse positioning mode, and the head assembly 24 has reached the desired cylinder track location.

Subsequently, when the difference count becomes zero, the difference counter (not shown) applies a lock-on control signal, at terminal 110; and, consequently, to the respective switches S1 and S3. Switch S1 connects the fine positioning servo loop, including the position amplifier 26, reactive filter network 28 and summing resistor R84 between the servo head output 32 and the summing junction 30. Switch S3 connects the voltage reference line 53 of filter 28, also referred to as voltage or signal return line, to the output 58 of the compensation circuit 10, which circuit will be described later. In the fine positioning mode the position of the head assembly 24 is maintained on the designated track location, until a subsequent coarse positioning mode is initiated as it is known in the art.

During operation in the fine positioning mode, the position amplifier 26 receives a position feedback signal in the form of a continuously varying signal via line 32 from the servo head located in the head assembly 24, indicating the magnitude and polarity of the servo head offset with respect to the center of the servo track. The position feedback signal is amplified by the position amplifier 26. In the prior art circuit known from the above-indicated Manual, that amplified signal is applied via a summing junction to the error amplifier input. The error amplifier 12 of FIG. 1 compares a negative or positive position feedback signal obtained at its inverting (−) input 50 with zero reference voltage obtained at its non-inverting (+) grounded input 51 and it applies a resulting positive or negative output signal via line 13 to the polarity detector 14, which, in combination with the forward or reverse amplifier 16 or 18, and power driver 20, causes the linear motor 22 to move slightly in either direction. This, in turn, causes the servo head to move in the opposite direction with respect to the direction of the offset until zero offset is obtained and the positon feedback signal is equal to zero, indicating that the servo head at 24 is aligned precisely with the center of the servo track.

However, in the preferred embodiment of FIG. 1 and in accordance with the present invention, the position feedback signal from the amplifier 26 is filtered by the reactive filter network 28, designed in accordance with the present invention as it will be described later in more detail. The filtered signal is applied from filter network 28 via output 33 thereof, summing resistor R84 and switch S1 to the summing junction 30 and, from there, to the inverting (−) input 50 of error amplifier 12. As it will become more apparent from the further disclosure, the combination of the reactive filter network 28 with the compensation circuit 10 in accordance with the teachings of the present invention is utilized to maximize the phase margin, bandwidth and, thus, the gain and positioning accuracy of the servo loop, and to maintain the maximum position accuracy when a D.C. offset forward or reverse signal is received by the servo circuit, as it will be disclosed below in detail.

As it is shown in FIG. 1, reactive filter 28 comprises a phase correction network 29 for providing phase margin in the servo loop and a gain roll-off filter network 31 for reducing the servo gain to a safe level at frequencies close to mechanical resonance, by providing a sharp attenuation in that region.

The phase correction network 29 comprises a non-inverting operational amplifier 37, having a feedback resistor R5 connected between its inverting (−) input and output. A series combination of capacitor C1 and resistor R1, connected in parallel to resistor R2, is coupled to non-inverting (+) of amplifier 37. The above combination of elements form a differentiating circuit, providing phase lead and high gain at high frequencies. Besides that, a series combination of resistor R3 and capacitor C2, connected between the non-inverting input (+) of operational amplifier 37 and the voltage reference line 53 of filter 28, form in combination with amplifier 37 an integrating circuit providing phase lag and high gain at low frequencies. In addition, a series combination of resistor R4 and capacitor C3, coupled between the inverting (−) input of amplifier 37 and return line 53 form an additional phase lead circuit in combination with amplifier 37. The above-indicated phase lead circuits compensate for phase lag resulting from the inertia which is inherent to the mechanical portion of the above-described positioning servo system, as it is well known in the art. Consequently, the above-described phase correction network 29 provides a phase margin necessary to achieve optimum servo stability and damping for the selected servo bandwidth, as determined by the design requirements.

As it is shown in the preferred embodiment of FIG. 1, the roll-off filter 31 is implemented by parallel combination of an inductor L1 and capacitor C4, which combination is in series with resistor R6. The above combination of elements is coupled to the output of operational amplifier 37, utilized in the phase correction network 29. Capacitor C5 is connected between the output terminal of resistor R6 and the voltage return line 53 of the filter circuit 28 to provide gain roll-off at frequencies beyond the frequency range of the servo.

The roll-off filter 31, connected to the output of operational amplifier 37, effects a desired minimum loss of the phase margin by providing a sharp attenuation in the region of the mechanical resonances, thus reducing the servo gain to a safe level in that frequency region. In order not to reduce the remaining phase margin, the attenuation is stopped at a suitable level by voltage divider action of capacitors C4 and C5. The above attenuation level still provides adequate suppression of remaining resonant peaks.

It follows from the above description of FIG. 1, that by utilizing the filter network 28, phase margin, bandwidth, gain and position accuracy of the servo loop are maximized, while operating in the near vicinity of the mechanical resonant frequencies.

Besides the above-described operation, in the fine positioning mode the known basic servo circuit of FIG. 1 receives an offset forward or offset reverse signal applied to obtain a maximum signal level by the data playback heads from recorded data tracks, as it has been mentioned previously. More particularly, if the maximum signal level obtained at playback from the recorded data tracks does not correspond to the center of the corresponding prerecorded servo track, an offset forward or reverse signal represented by a D.C. voltage step of a predetermined magnitude and polarity is applied to input terminal 36 or 38 by an offset forward or offset reverse latch (not shown) as it is known from the above-referenced Manual. The received voltage step is applied via summing resistor R10 or R11 to summing junction 30 where it is combined with the previously described fine position feedback signal obtained from the reactive filter 28 via summing resistor R84. The error amplifier 12 thus produces a position error signal at its output 13, with respect to a new reference D. C. voltage level responsive to the offset forward or reverse signal. From the previous description of the servo loop it follows that, as a result, the head assembly 24 will be moved by the linear motor 22 to a corresponding forward or reverse offset position with respect to the center of the servo track, in which position the data picked up by the playback heads will be at maximum signal level. This new offset position will be maintained by the servo loop, until the offset forward or reverse signal at the input 36 or 38 is either removed, or alternatively, changed to an offset signal of opposite polarity.

However, the sudden displacement of the servo head to the new offset position effects a sudden change in the D. C. voltage level of the position feedback signal from amplifier 26, which change is sensed as a D. C. step voltage by the input 27 of the reactive filter circuit 28. Since the reactive filter elements cannot charge or discharge instantly to the new D. C. level, due to well known inherent properties of these elements, a delayed filter response would result, which, in turn, would effect overshoot or undershoot transients at output 33 of the filter network 28, as it has been previously discussed. That, in turn, would cause overshoot or undershoot and, thus, related oscillations of the servo head position and delayed lock-on with respect to the servo track. Analogously, return from an offset position in either direction to a normal position having a zero reference voltage offset would cause similar undesirable effects in the servo circuit. Subsequent position changes in the servo caused by receiving respective offset signals of opposite polarities in fast succession, would effect an even more pronounced transient overshoot or undershoot in the servo loop and following undesirable servo delay.

Utilization of the composition circuit in combination with the reactive filter in accordance with the present invention eliminates the above-indicated disadvantages, as it will follow from further description of the preferred embodiment of FIG. 1 below.

The compensation circuit 10 comprises an inverting operational amplifier 51, having a feedback resistor R15 in parallel with feedback capacitor C15 and two input resistors R16, R17, respectively. Each input resistor R16, R17 has one terminal coupled to the inverting (−) input of the amplifier 51. The other terminal of input resistor R16 is coupled via line 16 to the previously described terminal 36 for receiving the offset forward signal. The other terminal of input resistor R17 is coupled via line 17 to previously described input terminal 38 for receiving the offset reverse signal. The output 58 of amplifier 51 is coupled via switch S3 to the voltage return line 53 of the reactive filter network 28. The non-inverting (+) input terminal of amplifier 51 is grounded. During normal operation in the fine positioning mode, when no position offset signal is received at terminal 36 or 38, the voltage return line 53 of filter 28 is held at ground level via switch S3 and amplifier 51.

When an offset forward or offset reverse signal is received at input terminal 36 or 38, respectively, it is applied via summing resistor R10 or R11 and summing junction 30 to the inverting (−) input of error amplifier 12, as previously described. Simultaneously, the same signal is applied via respective input resistor R16 or R17 to the inverting (−) input of operational amplifier 51 of the compensation circuit 10. Amplifier 51 applies a corresponding D.C. voltage level change, also referred to as voltage step, or step voltage, of opposite polarity from its output 58 via switch S3 to the voltage reference line 53 of filter 28. In the preferred embodiment of FIG. 1, switch S3 is controlled by the previously described lock-on signal obtained at terminal 110. The latter signal closes switch S3, simultaneously with switch S1, when the fine positioning mode is initiated by the servo circuit, as described previously. The parameters of the compensation circuit 10 are selected such that the voltage step at output 58, referred to as compensating voltage step or step voltage, is of the same magnitude and polarity as the previously described corresponding input voltage step applied by positioning amplifier 26 to the input 27 of filter 28, to compensate for the latter. Capacitor C15 acts as an integrating capacitor across amplifier 51, and its parameters are selected to provide a delay in both the offset forward and reverse signal path, respectively, from terminal 36 or 38 to the output 58 of amplifier 51, to match the delay resulting from the alternative passage of the particular offset signal through a portion of the previously described fine positioning servo circuit, including the summing resistor R10 or R11; error amplifier 12; polarity detector 14; forward or reverse amplifier 16 or 18; power driver 20; motor 22; servo head of assembly 24; and position amplifier 26. Since the offset signal passing through the above-indicated signal path is inverted by the error amplifier 12, respective voltage steps of the same polarity and magnitude are applied simultaneously to both the voltage return line 53 and to the input 27 of filter 28. As a result, the voltage return line 53 of the reactive filter 28 closely follows the D.C. voltage level changes applied to the filter input, thus effectively compensating for these changes with respect to the reactive filter. Consequently, a substantially constant D.C. voltage level is maintained between the input and return line of the filter, thus preventing the reactive filter elements from charging and discharging and from saturating the filter amplifier in response to the offset forward or reverse signal.

It will be appreciated that the above-disclosed combination of the compensation circuit 10 with the reactive filter network 28, in accordance with the preferred embodiment of FIG. 1 of the invention, allows a continuous fine positioning servo operation, without undesirable overshoot and undershoot transients and delay in response to D.C. offset signals received by the servo. It will be further appreciated that utilization of the compensation circuit 10 in combination with filter 28, coupled in the position feedback loop of the circuit of FIG. 1 allows increasing the overall servo loop gain in the positioning mode when comparing to prior art servos. The latter provision is achieved by selecting the respective values of the summing resistor R84, coupled to the inverting (−) input of error amplifier 12, and of the feedback resistor R85 of error amplifier 12 to obtain an optimum servo loop gain and thus improved positioning accuracy. For comparison, in the prior art position and velocity servo circuit such as known from the above-mentioned Manual, the gain of the servo loop in the positioning mode is reduced to less than optimum to obtain necessary servo stability. With reference to the preferred embodiment of FIG. 1, it is a particular advantage of the invention that the overall servo gain in the fine positioning mode is increased approximately twice when comparing to the above-indicated prior art servo circuit. Consequently, when utilizing the servo in accordance with the invention, including the combination of the reactive filter and compensation circuit as disclosed above, the recording track density may be doubled when comparing to the prior art disk storage drives. At the same time, utilization of the invention allows a corresponding increase in the positioning accuracy twofold with respect to the resulting narrow tracks.

It will be understood by those skilled in the art that in some applications where it may be necessary to apply a greater number of respective offset voltage steps to provide a plurality of respective stepped position changes by the servo circuit, the compensation circuit of FIG. 1 may comprise a plurality of input resistors, such as R16, R17, each for receiving a respective voltage step.

FIG. 2 shows an alternative embodiment of the invention utilized in a capstan servo circuit of a magnetic tape drive, such as known from the PR-2000 series Instrumentation Recorders, manufactured by Ampex Corporation, assignee of this patent application.

In the circuit of FIG. 2 a phase comparator 60 receives at a first input 62 a reference frequency signal, for example, a 100 KHz square wave from a crystal-controlled oscillator (not shown) and a tachometer feedback signal at a second input 64 from the tape drive. Alternatively, an off-tape signal from a reproduce amplifier (not shown) may be received at input 64, indicating tape speed as it is known in the art. The tachometer signal is obtained from an optical assembly, comprising a tachometer disc 73, rotating synchronously with the motor 72 and illuminated by light source 71, the velocity of rotation being sensed by detector 75. The detector 75 transforms the received light into an electric signal. The latter signal is amplified by operational amplifier 76 and subsequently fed back to input 64 of comparator 60. The phase comparator 60 compares the frequency and phase of its respective input signals at 62 and 64 and it provides an error signal in the form of a variable duty cycle square wave at output 65. The error signal from 65 is applied via a reactive filter network 57, comprising carrier filter 66 and phase lead-lag network 69, to motor amplifier 70. The carrier filter 66 comprises inductor L8, capacitor C8 and resistor R7 in a combination providing integration of the square wave output signal of the comparator 60, to obtain an error signal free of the carrier frequency. The phase lead-lag network 69 comprises resistors R8, R9, R12 and capacitors C6, C7 combined to provide a phase lead to stabilize the particular servo loop of the preferred embodiment of FIG. 2. The magnitude and polarity of the output signal of amplifier 70 is responsive to the error signal and it controls the rotational speed of motor 72 to compensate for deviations of the motor speed from the reference signal frequency. For a more complete disclosure, examples of detailed circuit diagrams of both the digital phase comparator 60 and synchronism detector 67 are shown in FIG. 2, such as known from the above-mentioned prior art PR-2200 series recorders. The phase comparator 60 comprises three binary flip-flop stages U10, U11 and U12 connected in tandem, for example, type MC 850 P, manufactured by Motorola Corporation. The output $\overline{Q}$ of binary stage U11 forms the output 65 of the phase comparator 60. Output 65 is connected to the input 61 of filter network 57.

Output 65 of comparator 60 is also connected to the input 68 of synchronism detector 67. The synchronism detector 67 comprises a one-shot multivibrator chip U3, for example, type 74123, manufactured by Texas Instruments Corporation, for detecting synchronism in the capstan servo drive. When phase lock occurs, the output 65 of phase comparator 60 ideally generates a 50 percent duty cycle, as it is known in the art. The synchronism detector 67 responsively generates a corresponding output signal at 80, in the form of a logic high pulse, as known in the art. The latter pulse is utilized in the circuit of FIG. 2 as an input signal applied to the compensation circuit 10. Since the D.C. voltage step occurring at the time of phase lock, obtained at the output 65 of the synchronism detector 60 is combined with the variable error signal, the output signal at 80 of the synchronism detector 67, representing a simple pulse, is better suited for use as input step signal of compensation circuit 10 as it will follow from the further description.

In operation, amplifier 70 receives the filtered error signal from the reactive filter network 57 and in response thereto it applies a driving control current of a corresponding magnitude and polarity causing the capstan motor 72 to accelerate or decelerate accordingly, in order to reduce the error signal. The feedback signal from detector 75 is applied via operational amplifier 76 to the feedback input 64 of the phase comparator 60, as previously mentioned. The feedback signal frequency at input 64 gradually increases or decreases until the latter signal is of the same frequency and polarity as the reference signal at input 62 of the phase comparator 60, that is, in the above-mentioned example, equal to 100 KHz. When the respective signals at terminals 62 and 64 are of the same frequency and approximately 90 degrees apart, phase-lock takes place indicating that the capstan servo reached synchronous speed. Consequently, the output signal at 65 changes from 100% duty cycle during motor acceleration to 50 percent duty cycle. The latter change represents a relatively large negative D.C. step voltage as it is known in the art. The negative step voltage is applied to the input 61 of the filter network 57. In the prior art devices the return line 59 of filters 66 and 69 is grounded. Since both filters comprise reactive components, as shown in FIG. 2, a filter delay results, which in turn effects overshoot or undershoot of the motor speed, until the reactive filter components adjust to the new D.C. voltage level, as it has been previously described in detail with respect to the embodiment of FIG. 1. Consequently, an appreciable delay results in achieving phase lock, which delay may exceed the start time specification of the capstan servo circuit. In some cases, when such devices are utilized in television or audio signal recording and playback, the speed overshoot or undershoot may be apparent to an observer.

Prior art devices dealt with the above problem by reducing the capstan servo loop gain, resulting in decreased effectiveness and, consequently, undesirable reduction of servo stiffness.

To eliminate the above-described disadvantages of the prior art capstan servo circuits, the circuit of FIG. 2 comprises an automatic compensation circuit 10 having an inverting operational amplifier 51, with an input resistor R18 and feedback resistor R15 in parallel with feedback capacitor C15. The inverting (−) input of amplifier 51 is coupled via input resistor R18 and a moveable contact 83 of potentiometer 81 to output 80 of the synchronism detector 67. Potentiometer 81 has its respective terminals coupled between output 80 of synchronism detector and ground. The output 58 of inverting amplifier 51 is connected to the voltage reference line 59 of filter network 57, in a similar manner as it has been shown and previously described with respect to FIG. 1. As it is seen in FIG. 2, the return line 59 is held at ground level via the non-inverting (+) input of operational amplifier 51 when no signal is received at input 82 of circuit 10.

When phase lock in the capstan servo circuit is achieved between the respective signals received at inputs 62 and 64 of the phase comparator 60, a negative D.C. voltage step indicating the resulting change of 50% duty cycle square wave at 65 is sensed by the one-shot multivibrator U3 of the synchronism detector 67, which, in turn, provides a logic high pulse at its output 80, as previously described. The latter pulse is applied to input 82 of the compensation circuit 10, via potentiometer 81, serving as a voltage divider to adjust the amplitude of the input pulse at 82. Alternatively, the potentiometer 81 may be deleted and the output 80 of the synchronism detector 67 connected directly to input 82 of the circuit 10. Integrating capacitor C15 is utilized to delay a compensating voltage step from output 58 of circuit 10 in order to coincide with receiving the related input step at input 61 of filter 57. The latter of the negative D.C. step provided by the phase comparator 65 is being received by the reactive filter input 61 at a lower rate of signal level change when comparing to providing a corresponding signal step from the digital synchronism detector. Thus, an inverted voltage step is provided by circuit 10 at output 58, applied to the voltage return line 59 of filter network 66 simultaneously with the input voltage step received at input 61 of filter network 57 from output 65 of phase comparator 60. The respective parameters of the compensation circuit 10 are selected such that the negative D.C. voltage step applied from output 58 to the return line 59 of filter 57, is of the same polarity and magnitude as the above-indicated D.C. voltage step simultaneously applied to input 61 of filter 57. Consequently, substantially identical D.C. voltage level changes of the same magnitude and polarity are introduced simultaneously into both the input 61 and return line 59 of the reactive filter network 57. Thus, a substantially constant D.C. voltage level is maintained with respect to the reactive filter elements. As a result, the reactive components utilized in the filter are effectively prevented from charging and discharging to a new D.C. level in response to a phase lock; and, consequently, overshoot and understood of the capstan motor speed and resulting lock-on delay is prevented.

It will be appreciated that the above-described circuit of FIG. 2 in accordance with the present invention enables compensation for sudden D.C. level changes occurring in the servo circuit, while allowing uninterrupted operation of the capstan servo circuit with respect to the continuosly variable error signal.

While in the foregoing description examples of particular circuit diagrams implementing the carrier filter 66 and lead-lag network 69 have been given, any suitable combination of elements, including reactive elements, may be utilized to obtain the desired above-described filter operation, as it is known in the art.

Another alternative embodiment of the invention is shown in FIG. 3, as being utilized in combination with a frequency synthesizer circuit. As it is known in the art, the frequency synthesizer comprises a digital phase comparator 90 which receives at a first input 88 a reference frequency input signal from a reference source, for example a crystal oscillator (not shown). At a second input 89 the phase comparator 90 receives a feedback signal via line 87. The feedback signal is provided by a voltage controlled oscillator 92, whose input receives an error signal applied from output 95 of phase comparator 90 via a reactive filter circuit 96, as known in the art. A frequency divider 94 adjusts the nominal output signal frequency of the oscillator 92 to the reference signal frequency received at input 88 of phase comparator 90. The digital phase comparator 90 detects the phase deviations of the feedback signal received at 89 with respect to the reference signal received at 88 and it provides the previously mentioned error signal at output 95, which is in form of a switching square wave signal, as it is well known in the art. The reactive filter 96 is utilized in the frequency synthesizer to average the switching square wave signal obtained at the output 95 in order to provide an analog signal suitable for controlling the output signal frequency of the voltage controlled oscillator 92 in a well known manner. In the prior art devices the voltage return line of the reactive filter 96 is grounded. In the preferred embodiment of FIG. 3 the reactive filter network 96 comprises a series inductor L9 and a parallel capacitor C9, coupled between output 95 of the phase comparator 90 and input 85 of the voltage controlled oscillator 92. The voltage return line of filter 96 is represented by a capacitor C9 terminal opposite to that connected to inductor L9. The digital phase comparator 90 may be implemented in a similar way as it has been previously disclosed with respect to digital phase comparator 60 of FIG. 2. In the latter case the output signal at 95 from the phase comparator 90 is in the form of a variable duty cycle square wave as it has been described with reference to FIG. 2. Analogously with the previously described embodiment of FIG. 2, a synchronism detector 97 is utilized in the embodiment of FIG. 3, which may be implemented similarly as previously described with respect to synchronism detector 67 of FIG. 2.

When phase lock occurs, that is, when the respective input signals at 88 and 89 of the phase comparator 90 have the same frequency and a relative phase shift of about 90 degrees, a relatively large D.C. voltage shift is generated at the output 95 of the phase comparator 90, as it has been described previously with respect to the embodiment of FIG. 2. The D.C. shift is applied to input 91 of the reactive filter 96. In the prior art frequency synthesizer circuits, where the voltage return line of the reactive filter is grounded, a resulting filter delay and, consequently, overshoot or undershoot of the desired voltage-controlled oscillator frequency would be effected, due to inherent features of the reactive filter components, as it has been discussed previously with respect to FIG. 2. In the alternative embodiment of FIG. 3, the above disadvantages are eliminated as follows.

In FIG. 3 a circuit 10 for compensation of overshoot, undershoot and delay in accordance with the invention is shown, which circuit is implemented in a similar way to that previously described and shown with reference to FIG. 2. For better comparison, corresponding elements of circuit 10 are designated in both FIGS. 2 and 3 by like reference numerals and similar portions of both circuits will not be described here to avoid repetition. The synchronism detector 97 is preferably of a similar design as the previously described detector 67 of FIG. 2. The input of synchronism detector 97 is connected to the output 95 of the phase comparator 90. The synchronism detector 97 provides a D.C. step voltage at its output 99 when phase lock at 95 takes place, as it has been previously described with respect to detector 67. A voltage divider in the form of potentiometer 86 is coupled between the output 99 of synchronism detector 97 and input 82 of the compensation circuit 10 to adjust the input voltage of circuit 10, similarly as previously described with reference to potentiometer 81 of FIG. 2. Output 58 of compensation circuit 10 is connected to the voltage return line 100 of reactive filter 96. Alternatively, the reactive filter 96 may be implemented by any suitable combination of elements comprising reactive elements, to provide desired averaging of the square wave signal obtained at output 95 of the phase comparator 90, as it is well known in the art.

From the foregoing description it will become apparent that the operation of the preferred embodiment of FIG. 3 with respect to phase comparator 90, filter 96, synchronism detector 97, potentiometer 86, and compensation circuit 10 in combination with other circuit elements is analogous to the previously described operation of corresponding circuit elements 60, 66, 67, 81 and 10 utilized in FIG. 2. Consequently, when a D.C. voltage step at the time of phase lock is applied to input 91 of filter 96 from output 95 of phase comparator 90, a corresponding D.C. voltage step of the same magnitude and polarity is applied simultaneously to the return line 100 of the filter 96 from output 58 of compensation circuit 10.

As a result, the elements utilized in filter 96 do not sense the D.C. voltage level changes applied to their respective terminals since substantially identical D.C. voltage steps are applied simultaneously to the filter input and voltage return line. Thus, a filter delay and following overshoot and undershoot transients due to charging or discharging of the reactive filter components is effectively compensated for in the frequency synthesizer of FIG. 3.

It will be understood by those skilled in the art that while in the preferred embodiments of FIGS. 2 and 3 a digital phase comparator is utilized examplewise, an analog phase comparator may be utilized, alternatively, since as it is known in the art, such analog phase comparator also provides a negative voltage step when phase lock is achieved, similarly to the above-disclosed digital device. A further alternative embodiment of the invention is shown in the block diagram of FIG. 4, representing a regulated power supply circuit. A regulated power supply 120, such as well known in the art, maintains a constant output voltage within predetermined limits. It is connected via power supply lines 122, 123, of which one line 123 is grounded, to feed one or more loads 124. Prior art regulated power supply circuits are known to utilize output filter capacitors connected between the power supply line 122 and ground reference line 123. The regulated power supply 120 may be implemented, for example as a switching power supply providing substantially constant output voltage in the form of a pulse sequence. In the latter case, a suitable reactive filter network is known to be connected to the prior art power supply lines at the output of the switching power supply to average the voltage pulses obtained therefrom in order to obtain a corresponding substantially constant analog voltage suitable for feeding the loads, as it is well known in the art.

When one or more loads are simultaneously connected to, or alternatively disconnected from, such a prior art power supply circuit, a sudden D.C. voltage level change is effected on the power supply lines. The voltage change, which is in the form of a negative or positive D.C. voltage step, causes discharging or charging of the reactive filter components, thus causing a delay in obtaining a desired constant voltage. Consequently, an overshoot or undershoot of the regulated voltage on the power supply lines results until the power supply circuit adjusts to the original D.C. voltage level corresponding to the desired regulated output voltage therefrom. During the above-indicated delay, the changing voltage on the lines effects an unregulated power supply to the loads, which in turn may cause faulty operation of the devices representing the loads.

The above-described disadvantages of the prior art regulated power supply circuits are eliminated by the circuit in accordance with the present invention, as it will follow from the description below related to the preferred embodiment of FIG. 4. In FIG. 4 a reactive filter network 127 is shown as being coupled to the output of the switching power supply 120. The reactive filter network 127 may be implemented by any suitable combination of passive and/or active circuit elements, including reactive elements, providing averaging of the output pulses obtained from the power supply 120, as it is well known in the art. As an example, the filter network 127 comprises a series inductor L10 and parallel capacitor C10 connected to the output of power supply 120 as shown in FIG. 4. Filter network 127 has an input 129, output 119 and a voltage reference line 128, also referred to as voltage return line, formed by a terminal of capacitor C10, opposite to the terminal connected to inductor L10 and to power supply line 122. However, as different from the prior art circuits, in the preferred embodiment of the invention the voltage return line 128 of filter 127 is not connected to the grounded power supply line 123. Instead, the voltage return line 128 is connected to virtual ground via an overshoot, undershoot and delay compensation circuit 10, provided in accordance with the present invention and similar to that previously described with reference to the embodiments of FIGS. 1 to 3. For better comparison, like elements of circuit 10 in FIGS. 3 and 4 are designated by like reference numerals. Consequently, only those portions of the circuit of FIG. 4 which are different from FIG. 3 will be described below to avoid repetition.

In the preferred embodiment of FIG. 4, the operational amplifier 51 is implemented as a power amplifier, since, in this particular embodiment, the compensation circuit 10 must operate also as a current source or current sink, respectively, when compensating for voltage spikes of either polarity occurring on power line 122 with respect to ground, in response to connecting or disconnecting loads from the circuit, as it will follow from further description.

In FIG. 4 the input 82 of circuit 10 is connected to a capacitive voltage divider 125, comprising a series combination of capacitors C20, C30, and having one terminal grounded. The other terminal of the voltage divider 125 is connected via a step voltage sensing line 126 to the power supply line 122, preferably at a location near the junction of the capacitor C10 with line 122 to avoid any delay in sensing the step voltage with respect to the filter 127, for reasons which will follow from the description below. Alternatively, the voltage divider 125 may be implemented by series resistors or a potentiometer (not shown), having one terminal connected to the sensing line 126 and another terminal to ground and having its output formed by a movable contact (not shown). An output of the voltage divider 125 is coupled to the input 82 of the compensation circuit 10. The voltage return line 128 of filter 127 is connected to a virtual ground via output 58 and the non-inverting (+) input of operational amplifier 51.

It is noted with respect to the foregoing description that if more than one separate filter circuit, comprising reactive components, is utilized and connected between the power supply 120 and loads 124, none of the respective return lines of those filters are connected to the grounded power line 123; instead, the return lines are connected to output 58 of circuit 10, as above-described with respect to return line 128 of filter 127. It will be understood with respect to the foregoing disclosure that the latter remark is applicable to the respective filter circuits of all previously described embodiments of FIGS. 1 to 4.

The operation of the preferred embodiment of the invention shown in FIG. 4 is as follows. During normal operation, when no substantial changes in the loads affecting D.C. voltage steps occur, the switching power supply 120 provides an output signal in the form of a duty cycle controlled pulse sequence, which is subsequently filtered by the reactive filter 127. The filter 127 provides an average voltage signal, which is maintained at a substantially constant value within predetermined limits by the power supply 120. That average voltage from the output 119 of filter 127 is supplied via power supply lines 122, 123 and output terminals 130 to 135, respectively, to loads 124.

When one or more additional loads 124 are connected to lines 122, 123, for example, to output terminals 136, 137, a sudden D.C. voltage level change in form of a negative D.C. voltage step is effected on line 122 with respect to ground, due to an increased current consumption by the additional loads. In the prior art circuits utilizing a reactive filter comprising a capacitor connected between the power supply lines 122, 123, the capacitor discharges in response to the negative voltage step in order to deliver extra current to the loads. Consequently, in the prior art circuits the voltage on the power supply lines continues to fall due to discharging the capacitor; and the time necessary for the prior art power supply circuit to adjust to the original output voltage level is delayed by a time required to charge the capacitor C10 back to the original voltage level.

In the circuit of FIG. 4 in accordance with the present invention, the above-described disadvantages of the prior art power supply circuits are eliminated as follows. The sensing line 126 connected to output 119 to filter 127 detects an above-mentioned negative or positive voltage step on line 122 caused by connecting or disconnecting a load 124 with respect to the circuit. That voltage step is applied via voltage divider 125 to input 82 of compensation circuit 10, and subsequently, via input resistor R18 to inverting (−) input of operational power amplifier 51 and to output 58. The parameters of capacitors C20, C30 of the voltage divider 125 are selected to apply a desired magnitude of the input voltage step to input 82 of circuit 10. The resistor values R18 and R15 set the gain of amplifier 51 and are selected to provide a desired magnitude of the compensating output voltage step at 58, necessary to compensate for the magnitude of the input voltage step occurring on line 122 in response to connecting or disconnecting a load as mentioned previously. Thus, when an additional load 124 is connected to the circuit, a negative voltage step on line 122 is sensed by line 126. The inverting power amplifier 51 responsively applies from its output 58 a positive voltage step adjusted to be of the same magnitude as the magnitude of the above-mentioned negative voltage step, to the voltage return line 128, that is, to the terminal of capacitor C10 opposite to that connected to line 122. Since the respective voltage steps are received substantially simultaneously by the opposite terminals of capacitor C10 and are of the same magnitude and opposite polarity, they compensate for each other. However, simultaneously with the positive voltage step on line 58, the power amplifier supplies a positive current step via capacitor C10 to the loads 124, to compensate for the increased current consumption effected by the additional loads, which caused the above-indicated negative voltage step on line 122 in the first place. The higher the gain setting of amplifier 51, the better the compensation and the smaller the resulting step on line 122. It follows from the above description that the compensation circuit 10 compensates for both, a negative voltage and current step caused by an increased power consumption, effected by connecting additional loads to the power supply circuit. Thus, the resulting power step applied by power amplifier 51 to the voltage return line 128 of the reactive filter 127 effectively compensates for both the sudden voltage level change as well as sudden change in current consumption by the loads.

It will be understood that analogously, if one or more loads 124 are simultaneously disconnected from the power supply lines 122, 123, a sudden D.C. voltage level change in the form of a positive D.C. voltage step is effected between these lines. In the latter case, the operation of the circuit of FIG. 4 is analogous to the previously described example, in that circuit 10 providessimultaneously at its output 58 a negative compensation voltage step of the same magnitude, thus compensating for the positive voltage step. At the same time, the output 58 of power amplifier 51 applies a negative compensation current step, thus acting as a current sink and absorbing the excess current on power line 122, effected by disconnecting the loads. Thus, the positive input power step effected by disconnecting loads from the power supply circuit is effectively compensated for by the circuit of the invention, by applying a negative compensation power step of the same magnitude to the return line of the reactive filter 127.

It is noted that in the compensation circuit 10 of FIG. 4, a feedback capacitor such as C15 previously described and shown with respect to FIGS. 1 to 3 is not utilized since there is no need to delay the output signal at 58 of circuit 10, to coincide with the input voltage step of filter 127 received at its output 119. To the contrary, it is preferable to select the parameters of the respective circuits 125 and 10 such that minimum signal delay is provided to obtain effective compensation.

It follows from the above description related to the preferred embodiment of FIG. 4 that utilization of the reactive filter and compensation circuit in combination with the power supply circuit as taught in accordance with the present invention compensates for transient overshoot, undershoot and filter delay in response to step signals applied to the reactive filter.

Thus, there has been described a compensation circuit for overshoot, undershoot and delay due to sudden D.C. level changes in response to step signals occurring in systems comprising reactive filters. An input step signal applied to the reactive filter is detected by the compensation circuit. The compensation circuit responsively provides a compensation D.C. step signal of substantially the same magnitude and predetermined polarity with respect to the input step signal. The compensation step signal is applied to the signal return line of the reactive filter to coincide with the input step signal received by the filter.

While the invention has been particularly shown and described with reference to embodiments thereof, it will be appreciated that various alternatives and modifications may be made which will fall within the scope of the appended claims.

I claim:

1. An apparatus for compensation of overshoot, undershoot and delay in response to step signals in systems having reactive filters, comprising in combination:
   (a) a reactive filter having an input, an output and a signal return line and having a filter element coupled therebetween, one of said input and output coupled to receive an input step signal; and
   (b) a compensation circuit having an input coupled to detect said input step signal, and having an output coupled to said signal return line of the reactive filter, said compensation circuit providing a ground reference for said filter, said compensation circuit coupled to provide a compensation step signal in response to said detected input signal, and to apply it to said signal return line simultaneously with said input step signal received by the filter, said compensation step signal being of substantially the same magnitude and a predetermined polarity with reference to said input step signal to compensate for a sudden signal level change with respect to said reactive filter, in response to said input step signal.

2. The apparatus of claim 1, wherein said compensation circuit comprises an operational amplifier having a first and a second input, at least one input resistor having a first terminal coupled to said amplifier first input and a second terminal forming said input of the compensation circuit, a feedback resistor coupled between said first input and an output of the amplifier, said second amplifier input being coupled to ground reference and said amplifier output forming said output of the compensation circuit.

3. The apparatus of claim 2, wherein said first input of the operational amplifier is coupled to detect said input step signal prior to being received by said reactive filter input and wherein said operational amplifier further comprises a feedback capacitor connected in parallel to said feedback resistor, for delaying said compensation step signal to coincide with said input step signal received by said reactive filter input.

4. The apparatus of claim 2, wherein said output of the reactive filter is coupled to receive said input step signal and wherein said operational amplifier is an inverting amplifier coupled to provide said compensation step signal of opposite polarity with respect to said input step signal received by the reactive filter output.

5. The apparatus of claim 2 or 3, wherein said operational amplifier is coupled to provide said compensation step signal of the same polarity with respect to said input step signal received by said filter input.

6. The apparatus of claim 2, 3, or 4, further comprising a voltage divider having one terminal coupled to detect said input step signal, a second terminal coupled to ground reference and an output coupled to said input of said compensation circuit.

7. The apparatus of claim 4, wherein said circuit further comprises a capacitive voltage divider having one terminal coupled to said reactive filter output, a second terminal coupled to ground reference, and an output terminal coupled to said input of the compensation circuit.

8. In a positioning servo system of the type providing stepped position changes in a positioning servo loop in response to offset step signals of known magnitude and polarity applied to said servo loop, the combination therewith comprising:
  (a) a reactive filter coupled in the positioning servo loop and having an input, an output and a signal return line, and having a filter element coupled therebetween, said filter input coupled to receive input step signals responsive to said offset step signals; and
  (b) an overshoot, undershoot and filter delay compensation circuit having separate inputs, each coupled to receive a respective offset step signal, said circuit having an output coupled to the signal return line of said reactive filter, said compensation circuit providing ground reference for said reactive filter, and providing a compensation step signal in response to an offset step signal, and applying it to said signal return line simultaneously with each respective input step signal received by the reactive filter, said compensation step signal being of substantially the same magnitude and polarity with respect to said input step signal.

9. The system of claim 8, wherein said compensation circuit comprises an operational amplifier having a first input coupled to a first and a second input resistor, respectively, said first input resistor coupled to receive an offset forward step signal of a known polarity, said second input resistor coupled to receive an offset reverse step signal of an opposite polarity, said operational amplifier having a second input coupled to ground reference, said compensation circuit further comprises a parallel combination of a feedback resistor and capacitor coupled between said amplifier first input and output, said amplifier output being coupled to said signal return line of said filter.

10. In a positioning servo system utilized in a magnetic disk recording device of the type having a linear motor for radially moving relative to a rotating disk surface a movable armature carrying a transducer assembly including at least a data head and a servo head, a position amplifier for amplifying a fine position feedback signal, provided by said servo head, an error amplifier for providing an error signal representative of a difference between a reference position signal and amplified fine position feedback signal to control the position of said servo head with respect to the center of the servo track, a means for applying an offset forward and offset reverse step signal, respectively, of predetermined magnitude and opposite polarity with respect to each other, to an input of said error amplifier, to provide a desired offset position of the servo head with respect to the center of the servo track, and wherein a corresponding offset position servo loop feedback signal is provided by the position amplifier in the form of a corresponding input step voltage, the combination therewith comprising:
  (a) a phase correction reactive filter for providing phase margin in the servo loop, having an input, output and a voltage return line, and having a filter element coupled therebetween, said input coupled to an output of the position amplifier;
  (b) a roll-off reactive filter for providing attenuation at mechanical resonant frequencies, having an input coupled to said output of said phase correction filter, having an output coupled to said error amplifier input, and having a voltage return line common with said voltage return line of the phase correction filter; and having a filter element coupled between its input, output and voltage return line; and
  (c) a compensation means having a first input coupled to receive said offset forward step signal, a second input coupled to receive said offset reverse step signal and an output coupled to said common voltage return line of said filters, said compensating means providing ground reference for both the phase correction reactive filter and roll-off reactive filter, said compensating means responsively providing a compensation step voltage and applying it to said common voltage return line simultaneously with said corresponding input step voltage provided by said position amplifier and received by said phase correction reactive filter input in response to one of said offset forward and offset reverse step signal, said compensation step voltage provided by said compensation means of being of substantially the same magnitude and polarity with respect to said corresponding input step voltage.

11. The system of claim 10, wherein said phase correction reactive filter input is coupled to receive said corresponding input step voltage of opposite polarity with respect to said offset forward or reverse signal respectively received by said first or second input of the compensating means, and wherein said compensating means comprises an operational amplifier having a first inverting and a second non-inverting input and an output, a first and a second input resistor for receiving one of said offset forward and offset reverse signals, respectively, coupled to said first amplifier input, said second amplifier input being coupled to ground reference, said compensating means further comprises a parallel combination of a feedback resistor and capacitor coupled between said amplifier first input and output, said amplifier output being coupled to said common voltage return line of said reactive filters.

12. The system of claim 10 or 11, further comprising a first switch coupled between said output of said compensating means and said common voltage return line of said reactive filters and a second switch coupled between said pass roll-off reactive filter output and error amplifier input, both switches being controlled to be closed by a control signal provided by said system and indicating that the transducer assembly is located within a desired track location of the rotating disk surface.

13. In a closed loop control system including an apparatus for providing a controlled signal, a phase comparator having a first input for receiving a reference signal and a second input for receiving a feedback signal, and having an output for responsively providing a variable error signal, said phase comparator output providing an input step signal in response to a frequency and phase lock occurring between said reference and feedback signal, said system further including a synchronism detector having an input coupled to receive said input step signal provided by said phase comparator, said synchronism detector having an output for responsively providing a corresponding step signal of a known magnitude and polarity, the combination therewith comprising:

(a) a reactive filter means having an input, an output and a signal return line, and having a filter element coupled therebetween, said input coupled to the phase comparator output, said reactive filter output coupled to an input of said apparatus for providing said controlled signal; and (b) a compensating means having an input coupled to said output of the synchronism detector for receiving said corresponding step signal, said compensating means having an output coupled to said signal return line of the reactive filter, said compensating means coupled to provide a ground reference for said reactive filter means, said compensating means providing a compensating step signal in response to said corresponding step signal and applying it to said signal return line simultaneously with said input step signal received by said filter input, said compensating step signal being of substantially the same magnitude and of the same polarity as said input step signal received by said filter.

14. The system of claim 13, wherein said compensating means comprises an operational amplifier having a first and a second input and an output, an input resistor having a first terminal coupled to said amplifier first input and a second terminal forming the input of said compensating means, a feedback resistor coupled between said amplifier first input and output, said amplifier second input being coupled to ground reference, said amplifier output forming the output of said compensating means.

15. The system of claim 14, wherein both said phase comparator and synchronism detector are digital devices and wherein said second terminal of said input resistor is coupled to receive said corresponding step signal from said synchronism detector prior to receiving said input step signal from said phase comparator by said reactive filter input, and wherein said operational amplifier further comprises a feedback capacitor connected in parallel with said feedback resistor, for delaying said compensation step signal to coincide with said input step signal received by said reactive filter input.

16. The system of claim 14 or 15 further comprising a voltage divider having respective opposite terminals coupled to said output of said synchronism detector and ground reference, respectively, and having a movable output coupled to said second terminal of said input resistor, for adjusting the amplitude of said corresponding step signal received by said compensating means.

17. In a regulated power supply circuit including a power supply means for providing a constant output voltage within predetermined limits, a first and a second power supply line coupled to said power supply means for transmitting said output voltage to one or more loads coupled to said lines, said second power supply line being connected to ground reference, the combination therewith comprising:

(a) a reactive filter having an input, an output and a voltage return line, and having a filter element coupled therebetween, said first power supply line coupling said filter input to an output of said power supply means and said filter output to said loads, respectively; and (b) a compensating means having an input coupled to said reactive filter output for receiving an input power step signal of negative or positive polarity in response to connecting a load to or disconnecting a load from said circuit, respectively, said compensating means having an output coupled to said compensating means having an output coupled to said voltage return line of the reactive filter, said said reactive filter, said compensating means responsively providing a compensating power step signal and applying it to said voltage return line simultaneously with said input power step signal received by said filter output, said compensating power step signal being of substantially the same magnitude and opposite polarity with respect to said input power step signal to compensate for a change in the output voltage level provided by said power supply means and in current consumption effected by connecting or disconnecting said load with respect to the regulated power supply circuit.

18. The circuit of claim 17, wherein said reactive filter comprises a capacitor having a first terminal coupled to said output of the power supply means and wherein said filter voltage return line is formed by a second terminal of said capacitor.

19. The circuit of claim 18 wherein said reactive filter further comprises an inductor coupled between said output of the power supply means and said first terminal of said capacitor.

20. The circuit of claim 18 or 19, wherein said compensating means further comprises an inverting operational power amplifier having an inverting input coupled to one terminal of an input resistor, the other terminal of said input resistor forming the input of said compensating means, said amplifier further having a non-inverting input connected to ground reference and a feedback resistor coupled between its inverting input and an output, said amplifier output forming said output of the compensating means.

21. The circuit of claim 20, further comprising a voltage divider having respective opposite terminals coupled to said reactive filter output, and ground, respectively, and having an output terminal coupled to said other terminal of said input resistor, for adjusting the amplitude of said input power step signal received by said compensating means.

22. The circuit of claim 21, wherein said voltage divider is formed by a series of combination of capacitors.

* * * * *